United States Patent
Nakajima et al.

(10) Patent No.: US 6,590,863 B1
(45) Date of Patent: Jul. 8, 2003

(54) OPERATION MODE CHANGING-OVER METHOD AND MULTIPLEX TRANSMISSION APPARATUS FOR REALIZING THE SAME

(75) Inventors: Katsutoshi Nakajima, Shizuoka-ken (JP); Akira Norizuki, Shizuoka-ken (JP); Akiyoshi Tomita, Shizuoka-ken (JP); Hiroshi Nishiyama, Shizuoka-ken (JP); Kazuyoshi Unno, Shizuoka-ken (JP); Yoshikazu Saito, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/377,063

(22) Filed: Aug. 19, 1999

(30) Foreign Application Priority Data

Aug. 20, 1998 (JP) ............................................ 10-234295

(51) Int. Cl.[7] ............................. G01R 31/08; H04J 15/00
(52) U.S. Cl. ..................................... 370/225; 370/464
(58) Field of Search ............................... 370/219, 220, 370/227, 228, 532, 536, 537, 498, 535, 542, 543, 225

(56) References Cited

U.S. PATENT DOCUMENTS 5,818,846 A * 10/1998 Mori et al. ................. 370/532

FOREIGN PATENT DOCUMENTS

JP 5-183562 7/1993

* cited by examiner

Primary Examiner—Wellington Chin
Assistant Examiner—Brenda Pham
(74) Attorney, Agent, or Firm—Finnegan, Henderson, Farabow, Garrett, & Dunner, L.L.P.

(57) ABSTRACT

A multiplex transmission apparatus is constructed with a plurality of nodes being connected to a multiplex transmission path. Each node has a multiplex transmission module for making multiplex communication with another node, a reception circuit connected to the multiplex transmission, and a micro-controller. The multiplex transmission apparatus has as its operation mode a multiplex communication mode in which each node performs its multiplex transmission and a sleep mode in which a multiplex transmission module is kept inoperative. When the reception circuit receives a seizing signal for changing over the operation mode from the sleep mode to the multiplex communication mode, from another node via the multiplex transmission path, a mode changing-over portion a micro-controller has changes over the operation mode from the sleep mode to the multiplex communication mode according to the seizing signal that has been received by the reception circuit, to thereby cause the multiplex transmission module to operate in the multiplex communication mode. A reception control portion in the micro-controller causes the reception circuit to makes its "off" operation immediately after transfer to the multiplex communication mode.

5 Claims, 6 Drawing Sheets

OPERATION MODE CHANGING-OVER METHOD AND MULTIPLEX TRANSMISSION APPARATUS FOR REALIZING THE SAME

BACKGROUND OF THE INVENTION

1. Technical Field

The present invention relates to an operation mode changing-over method wherein each of a plurality of nodes connected to a common multiplex transmission path can have its operation mode changed over between a multiplex communication mode in which multiplex communication is made via an interface for use in multiplex transmission that is provided in the node and a sleep mode in which the interface is kept inoperative, and to a multiplex transmission apparatus for realizing the same. More particularly, the invention concerns an operation mode changing-over method which enables the operation mode to be changed over from the sleep mode to the multiplex communication mode without providing a transmission line for exclusive use on a seizing signal, and a multiplex transmission apparatus for realizing the same.

2. Related Art

In recent years, a multiplex transmission apparatus for performing multiplex communication is loaded on a vehicle, and this multiplex transmission apparatus is constructed with a plurality of nodes being connected to a common multiplex transmission path. Each node has provided therein an interface for use in multiplex communication for multiplexing data and making transmission and reception thereof, whereby transmission and reception of data are made between micro-controllers provided in their relevant nodes via the multiplex communication interface and the multiplex transmission path.

In order to maximally suppress the power consumption, each node has a changing-over function for making a changeover between a multiplex communication mode in which multiplex communication is performed via the multiplex transmission interface and a sleep mode in which the multiplex transmission interface is kept inoperative to decrease the current consumption.

At an ordinary time, the node is operated in the sleep mode to thereby suppress useless power consumption. When prescribed activation conditions have been satisfied, the operation mode is changed over, using a seizing signal, to the multiplex communication mode in which to permit the multiplex transmission interface to operate the micro-controller into its operational state.

Figure 1:
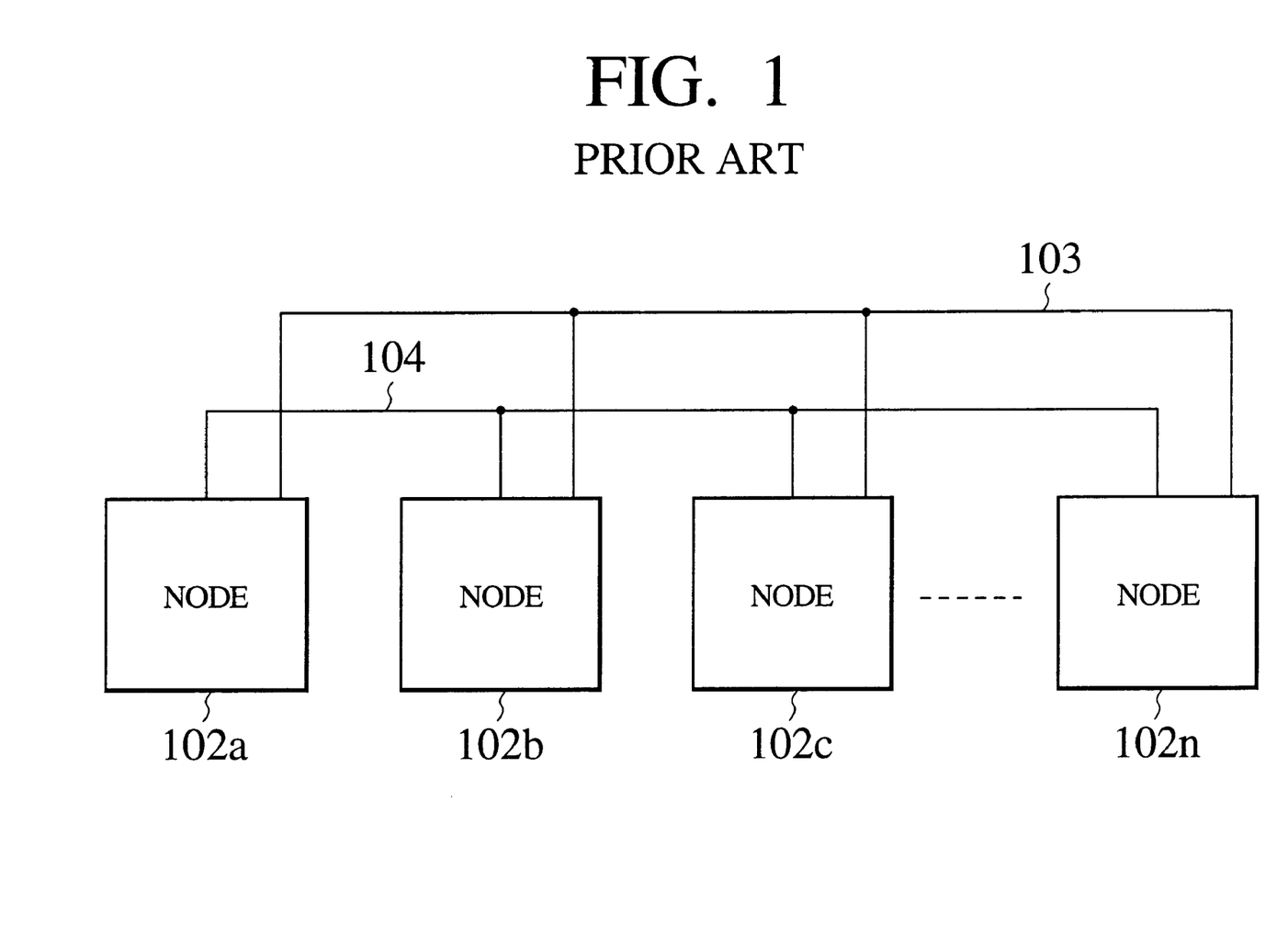
FIG. 1 is a construction block diagram illustrating an example of a conventional multiplex transmission apparatus.

FIG. 1 is a construction block diagram illustrating a conventional example of this type of multiplex transmission apparatus. In a multiplex transmission apparatus illustrated in FIG. 1, a plurality of nodes 102a to 102n are connected to a multiplex transmission path 103. A transmission line 104 for exclusive use on a seizing signal is provided separately from the multiplex transmission path 103 that is a data transmission line. Whereby, the node 102a transmits a seizing signal to all other nodes 102b to 102n via the transmission line 104 for exclusive use on a seizing signal.

When having received a seizing signal, each of the nodes 102b to 102n has its operation mode changed over from a sleep mode to a multiplex communication mode. As a result of this, every one of the nodes 102a to 102n has its operation mode transferred from the sleep mode to the multiplex communication mode, whereby bi-directional communication can be made between each node through the multiplex transmission path 103.

However, in the conventional multiplex transmission apparatus illustrated in FIG. 1, a transmission line for exclusive use on a seizing signal had to be provided separately from the multiplex transmission path. For this reason, there was the problem that the wire reduction effect resulting from the utilization of multiplex communication would be impaired.

Figure 2:
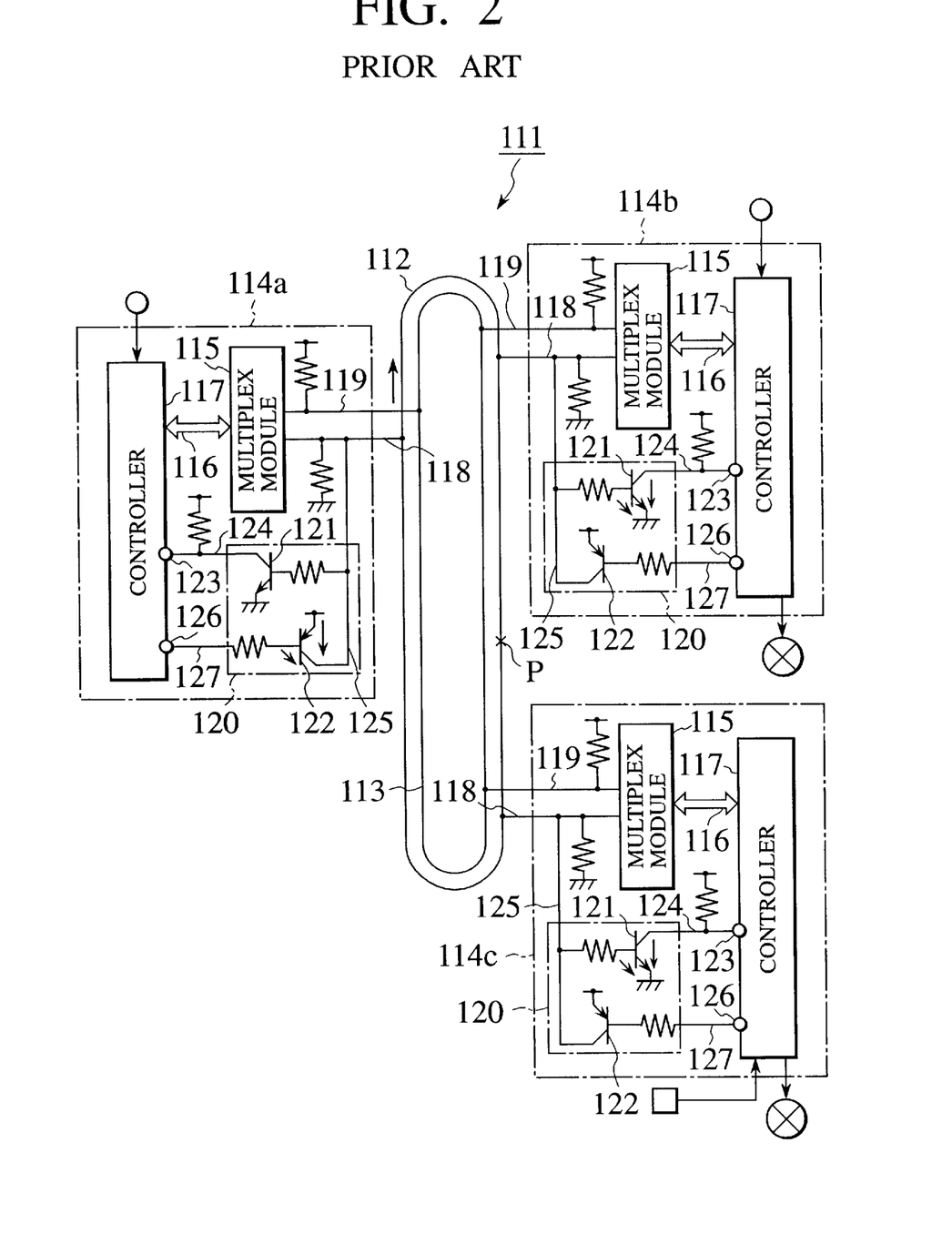
FIG. 2 is a construction block diagram illustrating another example of a conventional multiplex transmission apparatus.

On this account, as a technique that has solved this problem, a multiplex transmission apparatus that is described in Japanese Patent Application Laid-Open Publication No. H5-183562 is known. As illustrated in FIG. 2, in the multiplex transmission apparatus that is described in this Laid-Open Publication, nodes 114a, 114b, and 114c are connected to annular first and second transmission paths 112 and 113, whereby a controller 117 within each node 114a, 114b, and 114c transmits and receives a signal to and from another corresponding one via a multiplex module 115.

An activation circuit 120 for causing a seizing signal, which changes over the operational condition of the controller 117 from the sleep mode to the multiplex communication mode, to be input and output with respect to each corresponding one of the nodes 114a, 114b, and 114c is connected to the first transmission path 112. The activation circuit 120 has an input transistor 121 for inputting the seizing signal and an output transistor 122 for outputting the seizing signal.

In this construction, the controller 117 in the node 114a activates the multiplex module 115 and thereby activates the node 114a. On the other hand, the controller 117 outputs a seizing signal from its output terminal 126 to thereby make the output transistor 122 of the activation circuit 120 "on" and thereby activate the nodes 114b and 114c. Namely, the nodes 114b and 114c can be activated by the input transistors 121 thereof being made "on". The controller 117 of the node 114a, when a prescribed waiting time length $T_0$ has lapsed, outputs a transmission request frame via the multiplex module 115 and thereafter is transferred to the multiplex communication mode.

However, the multiplex transmission apparatus that is described in Japanese Patent Application Laid-Open Publication No. H5-183562 had the following problems.

(1) First, when at the time of the multiplex communication mode the input transistor 121 that is a reception portion of the starting circuit 120 is made "on", the current consumption inconveniently increases and the impedance of the transmission path varies. Namely, as a result of the "on" operation of the input transistor 121, the impedance of the reception end decreases and this impedance ceases to match with the impedance of the transmission path. This is followed by the new problems that the signal is inconveniently reflected, the waveforms are distorted, the transmission data changes itself into a meaningless form, and the radiation noises increase.

(2) Further, at the time of activation, awaiting length of time is provided in order to prevent the element from being destroyed due to the phenomenon that the output transistor 122 that is a transmission portion and the output of the multiplex module 115 are short-circuited. This deteriorated the responsiveness to starting.

(3) Furthermore, since the output transistor 122 that is a transmission portion was provided in the activation circuit 120, the cost was increased by that extent.

SUMMARY OF THE INVENTION

It is an object of the present invention to provide an operational mode changing-over method that makes it possible to enhance the responsivity to activation without causing a increase in the current consumption and causing the occurrence of waveform distortions and that can be realized with an inexpensive construction, and a multiplex transmission apparatus for realizing the same.

To attain the above object, according to an aspect of the present invention, there is provided a multiplex transmission apparatus wherein a plurality of nodes are connected to a multiplex transmission path; each node performs communication, via an interface portion for use in multiplex transmission that has been provided therein, with another node; and each node has its mode that is changeable over between a multiplex communication mode for performing multiplex transmission and a sleep mode in which the interface portion is kept inoperative, each node comprising: a reception circuit that is connected to the multiplex transmission path and receives from the other node via the transmission path a seizing signal for making a changeover of the operation mode from the sleep mode to the multiplex communication mode; a mode changing-over portion that changes over the operation mode from the sleep mode to the multiplex communication mode according to the seizing signal received by the reception circuit to thereby cause the interface portion to operate in the multiplex communication mode, and a reception control portion for causing the reception circuit to make its "off" operation immediately after transfer to the multiplex communication mode.

According to this invention, when the reception circuit receives a seizing signal for making a changeover of the operation mode from the sleep mode to the multiplex communication mode from another node via the multiplex transmission path, the mode changing-over portion changes over the operation mode from the sleep mode to the multiplex communication mode according to the seizing signal received by the receiving circuit to thereby cause the interface portion to operate in the multiplex communication mode, while the reception control portion causes the reception circuit to make its "off" operation immediately after transfer to the multiplex communication mode.

Accordingly, at the time of the multiplex communication mode, the current consumption ceases to increase and, since the reception circuit is made "off", the reception circuit ceases to have any effect on the multiplex transmission path. As a result of this, the waveform distortion ceases to occur in the multiplex transmission path.

In a preferred embodiment of the present invention, the interface portion is connected to the multiplex transmission path and, in a case where activating the other node, transmits the seizing signal to the other node via the multiplex transmission path.

According to this embodiment, since the interface portion in the case of activating the other node, transmits the seizing signal to the other node via the multiplex transmission path, the responsivity to activation of the node can be improved and, in addition, it becomes unnecessary to provide a special transmission circuit, with the result that the cost becomes low.

In a preferred embodiment of the present invention, the reception circuit comprises a first transistor circuit that is connected to the multiplex transmission path and that makes its "on" operation upon input of the seizing signal and outputs an output voltage to the mode changing-over portion, and a second transistor circuit that is connected in series to the first transistor circuit and that makes its "on" operation when the operation mode is in the sleep mode and, immediately after transfer to the multiplex communication mode, makes its "off" operation upon receipt of a reception control signal from the reception control portion, and, through the "off" operation, causes the first transistor circuit to make its "off" operation.

According to this embodiment, when the first transistor circuit makes its "on" operation upon input of the seizing signal and outputs an output voltage to the mode changing-over portion, the mode changing-over portion makes a change-over of the operation mode from the sleep mode to the multiplex communication mode. As a result of this, the second transistor circuit, immediately after transfer to the multiplex communication mode, makes its "off" operation upon receipt of a reception control signal from the reception control portion, and, through this "off" operation, causes the first transistor circuit to make its "off" operation. Therefore, at the time of the multiplex communication mode, the current consumption ceases to increase and, since the reception circuit is made "off", the reception circuit ceases to have any effect on the multiplex transmission path. As a result of this, the waveform distortion ceases to occur in the multiplex transmission path.

In a preferred embodiment of the present invention, the plurality of the nodes are connected to the multiplex transmission path in the form of a ring.

According to this embodiment, since the plurality of nodes are connected to a ring-like multiplex transmission path, even when part of the multiplex transmission path is broken, all the nodes can be activated if transmitting the seizing signal in the opposite direction.

To attain the above object, according to another aspect of the present, there is provided an operation mode changing-over method wherein in each of a plurality of nodes connected to a multiplex transmission path, changeover is made between a multiplex communication mode for performing multiplex transmission and a sleep mode in which an interface portion is kept inoperative, the operation mode changing-over method comprising the steps of: receiving by a reception circuit via the multiplex transmission path a seizing signal for making a changeover of the operation mode from the sleep mode to the multiplex communication mode; changing over the operation mode from the sleep mode to the multiplex communication mode according to the seizing signal received by the reception circuit to thereby cause the interface portion to operate in the multiplex communication mode, and causing the reception circuit to make its "off" operation immediately after transfer to the multiplex communication mode.

The nature, principle and utility of the invention will become more apparent from the following detailed description when read in conjunction with the accompanying drawings.

DESCRIPTION OF THE PREFERRED EMBODIMENT

An embodiment of a multiplex transmission apparatus and a multiplex transmission method of the present invention will now be explained in detail with reference to the accompanying drawings.

Figure 3:
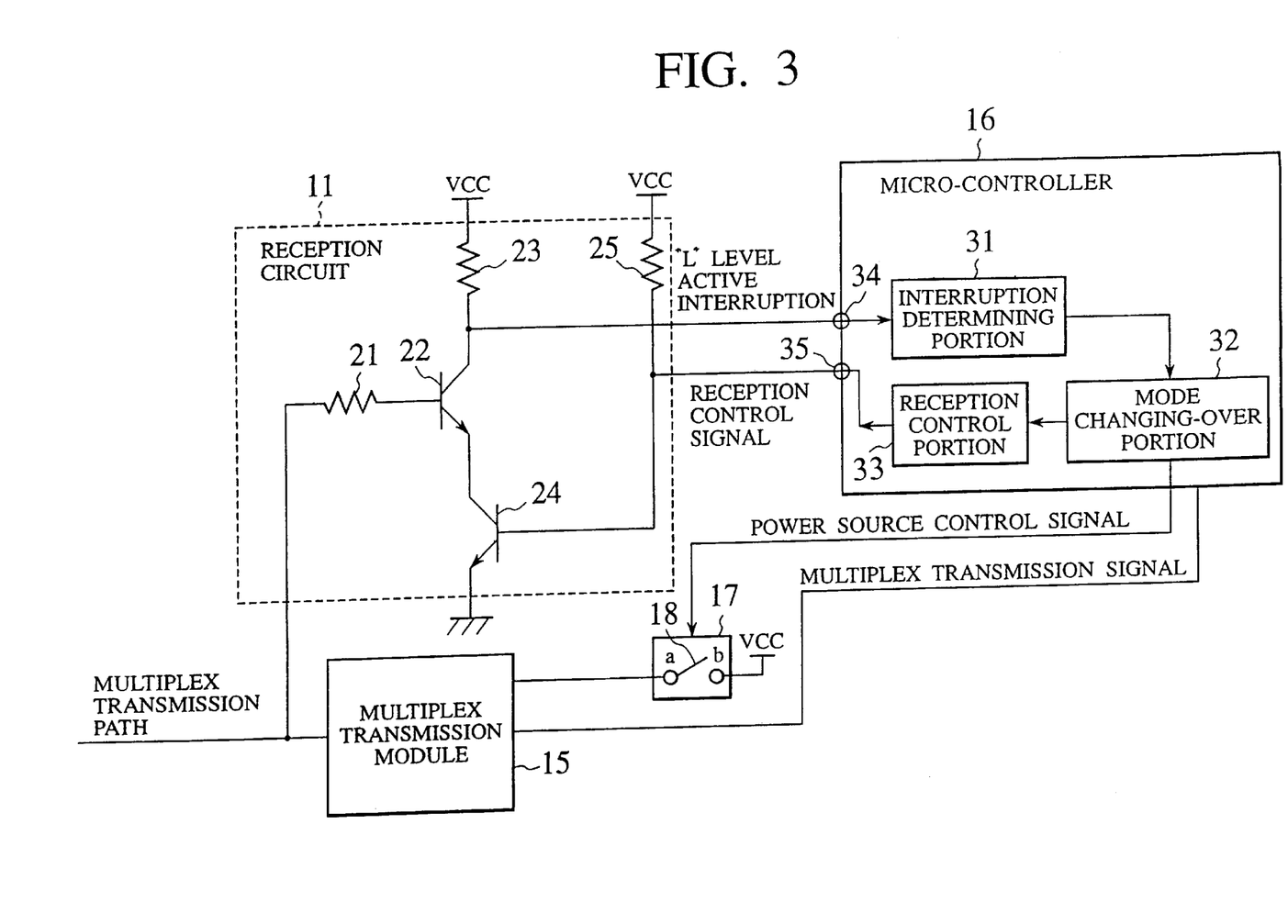
FIG. 3 is a detailed construction block diagram illustrating each node that has been provided in a multiplex transmission apparatus according to an embodiment.
Figure 4:
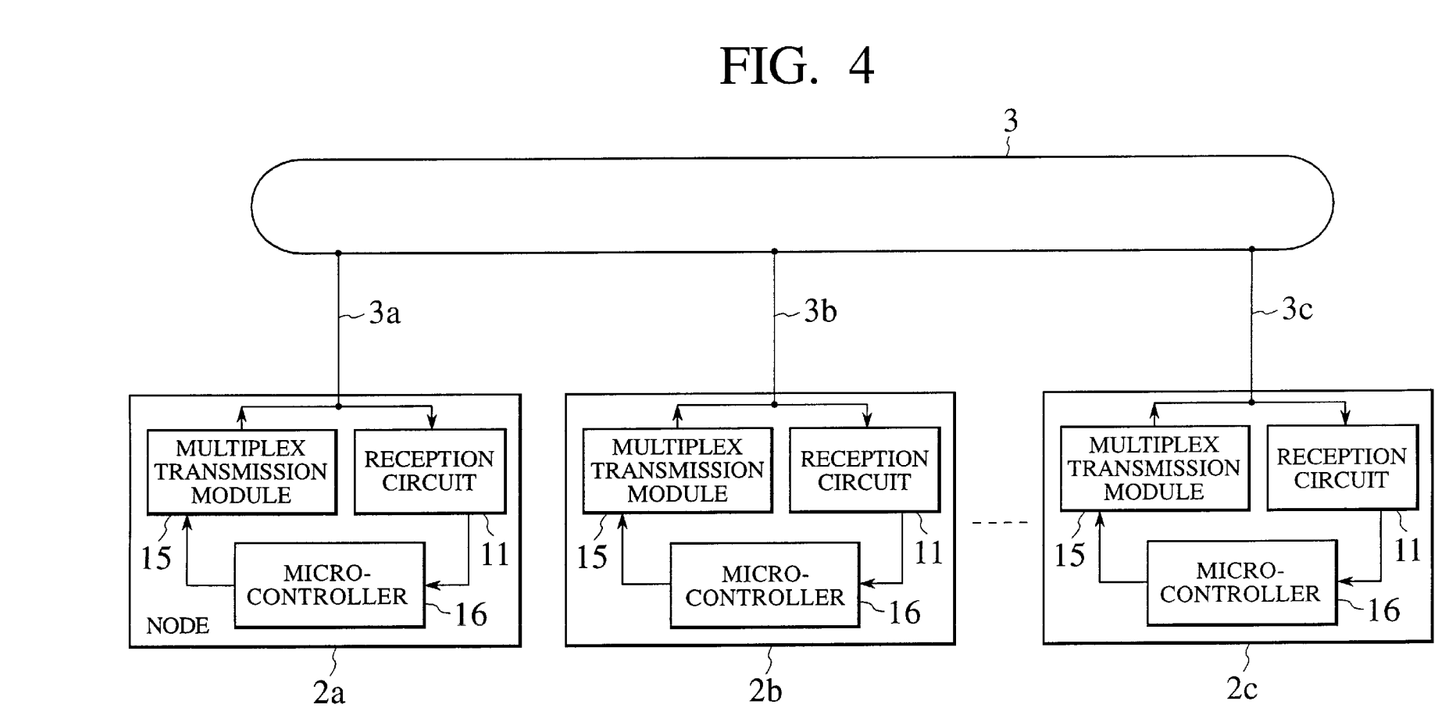
FIG. 4 is a construction block diagram illustrating the multiplex transmission apparatus according to the embodiment of the present invention.

FIG. 3 is a detailed construction block diagram illustrating each node that has been provided in a multiplex transmission apparatus according to an embodiment. FIG. 4 is a construction block diagram illustrating the multiplex transmission apparatus according to the embodiment of the present invention.

In the multiplex transmission apparatus illustrated in FIG. 4, it is arranged that a plurality of nodes 2a to 2n are connected to a ring-like transmission path 3, whereby mutual multiplex communication can be made between each nodes through a multiplex transmission path 3.

One of the plurality of the nodes is arranged to send out a seizing signal for activating all of the other nodes to these all of the other nodes. This seizing signal is a signal for changing over the mode of the nodes from a sleep mode to a multiplex communication mode, and, is, for example, an H level signal.

Each node 2a to 2n has a reception circuit 11, a multiplex transmission module 15 serving as an interface portion, and a micro-controller 16. The reception circuit 11 makes an "on" operation at the time of activation, and receives a seizing signal that is sent on from an activating node (e.g., the node 2a) through the multiplex transmission path 3. The reception circuit 11 is arranged to make an "off" operation immediately after the mode of the node has been transferred to the multiplex communication mode.

The micro-controller 16 can make a changeover of the mode between the sleep mode in which the multiplex transmission module 15 is kept inoperative and the multiplex communication mode in which multiplex communication is made, and can operate the multiplex transmission module 15 in either one of the modes. Upon receipt of a seizing signal that has been received by the reception circuit 11, the micro-controller 16 makes a changeover from the sleep mode to the multiplex communication mode.

The multiplex transmission module 15 is a multiplex communication interface for multiplexing data and making transmission and reception thereof, and sends a multiplex transmission signal from the micro-controller 16 to the multiplex transmission path 3. Also, the multiplex transmission module 15, in a case where its node is an activating node, sends a seizing signal to another node.

Each node 2a to 2n has stored therein its own equipment address, a source address, destination addresses, data, etc. Each node 2a to 2n has data taken therein if this data that has been received thereby is one that has been directed toward it, and, if the data that has been received thereby is not one that is directed to it, sends this data to the multiplex transmission path 3 as it is. On the other hand, if there is data that is to be transmitted, the node sends this transmission data to the multiplex transmission path 3.

Next, a detailed construction of each node will be explained with reference to FIG. 3. As illustrated in FIG. 3, each node is constructed of the reception circuit 11, multiplex transmission module 15, micro-controller 16, and switch 17 having provided therein a contact piece 18, The reception circuit 11 is constructed as follows. To the multiplex transmission path 3 is connected one end of a resistor 21, the other end of which is connected to the base of a first transistor 22. The collector of the first a transistor 22 is connected to a power source VCC through a resistor 23 and is connected to an interruption terminal 34 that is provided to the micro-controller 16. The emitter of the first transistor 22 is connected to the collector of a second transistor 24.

The emitter of the second transistor 24 is grounded. The base of the second transistor 24 is connected to the power source VCC through a resistor 25 and is also connected to a reception control terminal 35 that is provided to the micro-controller 16.

Here, the resistor 21, first transistor 22, and resistor 23 constitute a first transistor circuit. The resistor 25 and the second transistor 24 constitute a second transistor circuit.

The terminal a of the switch 17 is connected to the multiplex transmission module 15. The terminal b thereof is connected to the power source VCC. The switch 17 is arranged to become "on" upon receipt of a power source control signal that is sent on from the micro-controller 16 and thereby supply the power source VCC to the multiplex transmission module 15.

Next, a detailed construction of the micro-controller 16 will be explained. The micro-controller 16 is constructed of an interruption determining portion 31, a mode changing-over portion 32, and a reception control portion 33. The interruption determining portion 31 has input thereto a collector voltage of the first transistor 22 and determines using the level value of this collector voltage whether an interruption (e.g., an "L" level active interruption that occurs when the level value of the collector voltage has come to have an L level) has occurred.

In a case where it has been determined by the interruption determining portion 31 that an interruption has occurred, the mode changing-over portion 32 makes a changeover from the sleep mode to the multiplex communication mode. Simultaneously, the mode changing-over portion 32 outputs to the switch 17 a power source control signal for making the switch 17 "on" to thereby operate the multiplex transmission module 15 in the multiplex communication mode.

The reception control portion 33, in a case where the mode has been changed over by the mode changing-over portion 32 from the sleep mode to the multiplex communication mode, outputs an L level signal to the reception control terminal 35 in order to cause the first transistor 22 and second transistor 24 to make their "off" operation.

Figure 5:
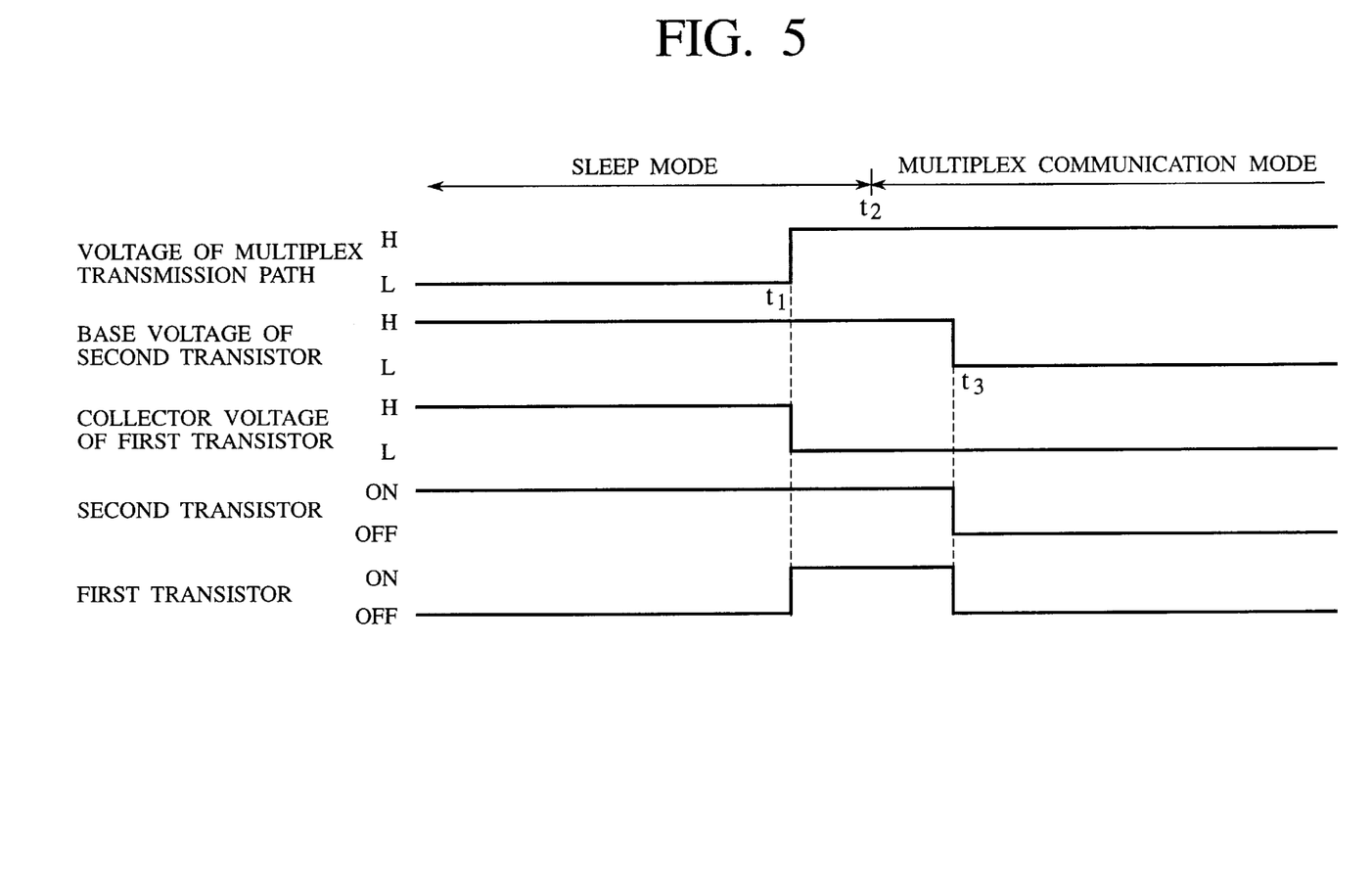
FIG. 5 is a timing chart illustrating the operation of a reception circuit within a node that is provided in the multiplex transmission apparatus according to the embodiment.
Figure 6:
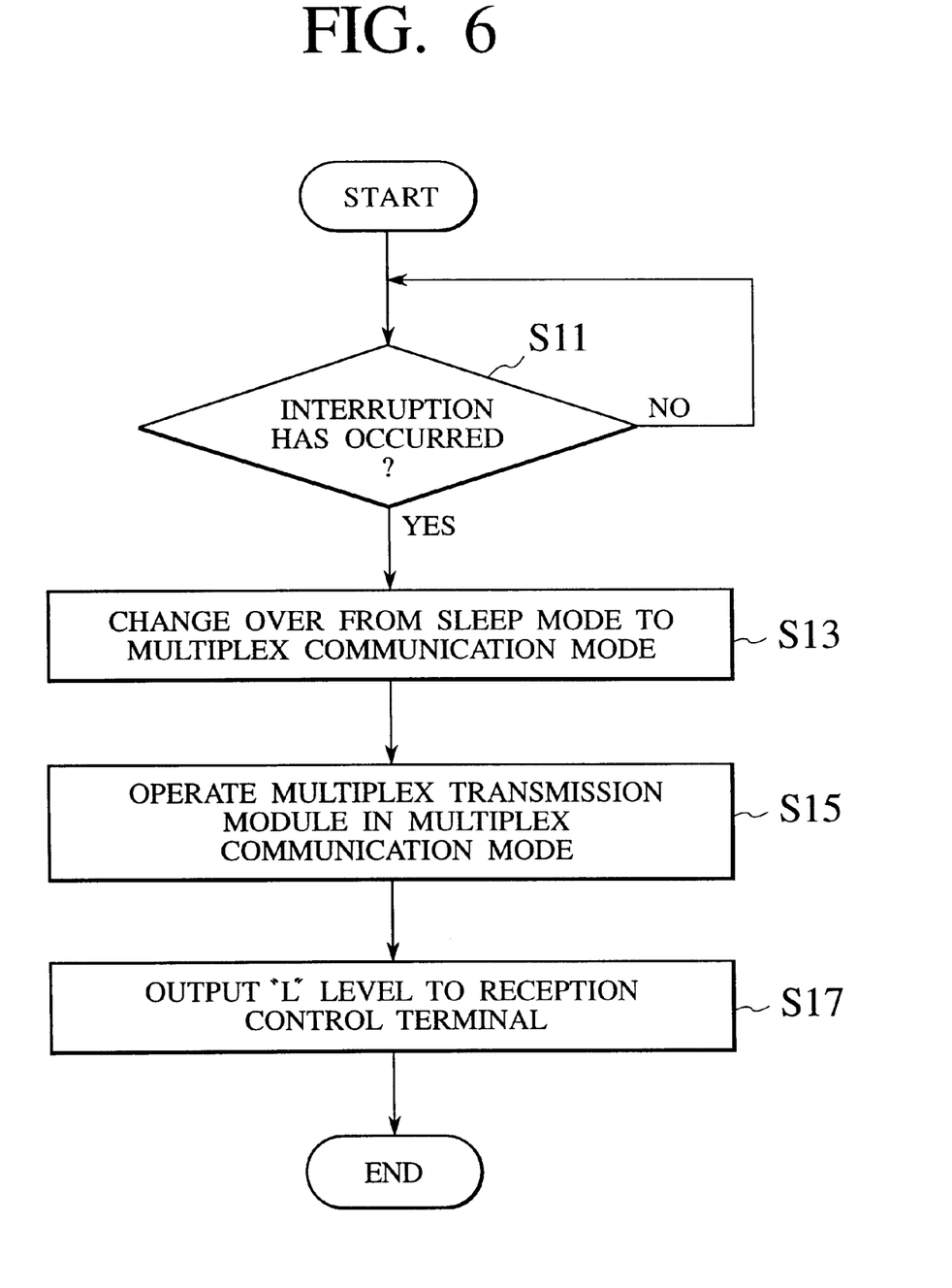
FIG. 6 is a flow chart illustrating the operation of a micro-controller within each node that has been provided in the multiplex transmission apparatus according to the embodiment.

Next, the operation of the above-constructed multiplex transmission apparatus, i.e. the multiplex transmission method will be explained in detail with reference to the drawings. FIG. 5 is a timing chart illustrating the operation of a reception circuit within a node that is provided in the multiplex transmission apparatus according to the embodiment. FIG. 6 is a flow chart illustrating the operation of a micro-controller within each node that has been provided in the multiplex transmission apparatus according to the embodiment.

First, as illustrated in the timing chart of FIG. 5, it is assumed that each node 2a to 2n is in the state of sleep mode. In this case, since the activating node 2a is sending no seizing signal to any one of the nodes 2b to 2n, the voltage on the multiplex transmission path 3 is kept at the state of L level.

At this time, since the micro-controller 16 is in the state of sleep mode, the reception control terminal 35 is in the state of input. For this reason, an electric current is supplied from the power source VCC to the base of the transistor 24 via the resistor 25, this second transistor 24 is being "on". It is to be noted that, at this time, the electric current that is caused to flow via the resistor 25 is not of a magnitude that would have effect on the current consumption as defined with regard to the sleep mode time, and is at several tens of uA or so, for example.

Next, at a time $t_1$, in order to activating every one of all other nodes 2b to 2n, the activating node 2a sends out an H level signal to the multiplex transmission path 3 as a seizing signal.

On the other hand, in each node 2b to 2n, the reception circuit 11 receives the seizing signal from the multiplex transmission path 3. In the reception circuit 11, upon its receipt of the H level seizing signal, an electric current is caused to flow into the base of the first transistor 22, the collector of the second transistor 24, and the ground GND via the resistor 21.

Namely, the first transistor 22 goes "on" and the collector voltage of the first transistor 22 changes from an H level to an L level. Then this collector voltage that has come to have the L level is input to the interruption-determining portion 31 within the micro-controller 16 as an "L" active interruption signal.

Next, the operation of the micro-controller 16 will be explained according to the flow chart of FIG. 6. The interruption-determining portion 31 determines whether an interruption has occurred (step S11). The interruption-determining portion 31 determines according to the input of the "L" level signal that an interruption has occurred, and outputs an interruption occurrence signal to the mode changing-over portion 32.

Having determined according to the interruption occurrence signal from the interruption-determining portion 31 that a seizing signal has been input, the mode changing-over portion 32, at a time $t_2$, makes a changeover of the mode from the sleep mode to the multiplex communication mode (step S13), brings the reception control terminal 35 from the state of input to the state of output of the "L" level signal via the reception control portion 33 (step S15), and outputs a power source control signal to the switch 17. As a result of this, the power source VCC is supplied to the multiplex transmission module 15, with the result that the multiplex transmission module 15 is operated in multiplex communication mode (step S17). Namely, this relevant node is activated. Therefore, it is possible to commence multiplex communication between the nodes.

It is to be noted that the reason for bringing the reception control terminal 35 from the state of input to the state of output of "L" level via the reception control portion 33 is for the purpose of making the first transistor 22 and the second transistor 24 "off". That the reception control terminal 35 is made to have the "L" level means that the base of the second transistor 24 is made to have the "L" level. Therefore, the second transistor 24 goes "off".

For this reason, no electric current comes to be caused to flow from the emitter of the first transistor 22, with the result that the first transistor 22 goes "off" regardless of the potential of the base thereof, i.e. the state of the multiplex transmission path 3.

Namely, no electric current whatsoever comes to flow from the multiplex transmission path 3 via the resistor 21, and, therefore, in a case where the reception circuit 11 is viewed from the multiplex transmission path 3, the state of the reception circuit 11 becomes equivalent to a state (an open state) where the resistor 21 and the first transistor 22 are not connected to the multiplex transmission path 3. For this reason, the reception circuit 11 comes to have no effect whatsoever upon the multiplex transmission path 3.

Regarding this respect, a detailed explanation will hereafter be given comparing the embodiment and the conventional way of operation. First, it is necessary to match the impedance of the reception end with the impedance of the multiplex transmission path 3. The impedance of the reception end is a synthetic impedance that results from the parallel connection between the reception circuit 11 and the multiplex transmission module 15. In the conventional way, since the reception circuit becomes "on" at the time of multiplex communication mode, the impedance thereof becomes low.

Therefore, the synthetic impedance becomes a low impedance by being determined depending almost upon the impedance of the reception circuit. As a result of this, the impedance of the reception end failed to match with the impedance of the multiplex transmission path 3.

On the other hand, since the reception circuit 11 is made "off" at the time of multiplex communication mode, the impedance thereof becomes very high. Therefore, the synthetic impedance is determined depending almost upon the impedance of the multiplex transmission module 15. As a result of this, the impedance of the reception end has come to match with the impedance of the multiplex transmission path 3.

Accordingly, at the time of multiplex communication mode, the current consumption can be decreased, distortions of the waveforms cease to occur, and change of data transmission into a meaningless form, generation of radiation noises, and etc. cease to occur.

Further, since at the time of activation a seizing signal is sent out directly from the multiplex transmission module 15 and so no necessity to provide a waiting time as in the prior art exists, the responsivity to activation can be improved. In addition, since it is unnecessary to provide an output transistor such as the conventional output transistor 122, the cost is reduced by this extent and this makes it possible to provide an inexpensive multiplex transmission apparatus.

Furthermore, although as a matter of course, it is possible to operate the multiplex transmission module 15 in the mode of multiplex communication by changing over the mode from the sleep mode to the multiplex communication mode without providing a transmission line for exclusive use on a seizing signal separately from the multiplex transmission path 3 that is a data transmission line.

Further, since a plurality of nodes are connected to a ring-like multiplex transmission path 3, even when part of the multiplex transmission path 3 is broken, all the nodes can be activated if transmitting a seizing signal in the opposite direction.

Incidentally, the present invention is not limited to the multiplex transmission apparatus of the above-described embodiment. The construction of the multiplex transmission apparatus is not limited to a network in the form of a ring, and may also be made into a bus-type network that has been constructed by a plurality of nodes being connected to a common bus.

More generally, it should be understood that many modifications and adaptations of the invention will become apparent to those skilled in the art and it is intended to encompass such obvious modifications and changes in the scope of the claims appended hereto.

What is claimed is:

1. A multiplex apparatus having a plurality of nodes connected to a multiplex transmission path, each node performing communication, via an interface portion for use in multiplex transmission that has been provided therein, with another node, and each node having a mode that is changeable between a multiplex communication mode for performing multiplex transmission and a sleep mode in which the interface portion is kept inoperative, each node comprising:

a reception circuit connected to the multiplex transmission path for receiving from the other node, via the transmission path, a seizing signal for making a changeover of the operation mode from the sleep mode to the multiplex communication mode;

a mode changing-over portion that changes over the operation mode from the sleep mode to the multiplex communication mode according to the seizing signal received by the reception circuit, thereby to cause the interface portion to operate in the multiplex communication mode; and a reception control portion for causing the reception circuit to make an "off" operation immediately after changing over to the multiplex communication mode.

2. A multiplex transmission apparatus according to claim 1, wherein the interface portion is connected to the multiplex transmission path and, in a case where activating the other node, transmits the seizing signal to the other node via the multiplex transmission path.

3. A multiplex transmission apparatus according to claim 1, wherein the reception circuit comprises:

a first transistor circuit connected to the multiplex transmission path and making an "on" operation upon input of the seizing signal and outputs an output voltage to the mode changing-over portion; and a second transistor circuit connected in series to the first transistor circuit and making an "on" operation when the operation mode is in the sleep mode and, immediately after transfer to the multiplex communication mode, makes an "off" operation upon receipt of a reception control signal from the reception control portion, and through the "off" operation, causes the first transistor circuit to make an "off" operation.

4. A multiplex transmission apparatus according to claim 1, wherein the plurality of the nodes are connected to the multiplex transmission path in the form of a ring.

5. An operation mode changing-over method wherein, in each of a plurality of nodes connected to a multiplex transmission path, changeover is made between a multiplex communication mode for performing multiplex transmission and a sleep mode in which an interface portion is kept inoperative, the operation mode changing-over method comprising the steps of:

receiving, by a reception circuit via the multiplex transmission path, a seizing signal for making a changeover of the operation mode from the sleep mode to the multiplex communication mode;

changing over the operation mode from the sleep mode to the multiplex communication mode according to the seizing signal/received by the reception circuit to thereby cause the interface portion to operate in the multiplex communication mode; and causing the reception circuit to make an "off" operation immediately after changing over to the multiplex communication mode.

* * * * *